United States Patent
Piette

[15] 3,686,945
[45] Aug. 29, 1972

[54] VENT FOR FLUID FLOW METERING DEVICE

[72] Inventor: Leonard A. Piette, Cranston, R.I.

[73] Assignee: Taco, Inc., Cranston, R.I.

[22] Filed: Sept. 21, 1970

[21] Appl. No.: 74,043

[52] U.S. Cl. .................................. 73/208, 137/315
[51] Int. Cl. ........................................... G01l 19/12
[58] Field of Search ............... 73/207, 208, 209, 419; 116/117; 137/315

[56] References Cited

UNITED STATES PATENTS

| 2,210,081 | 8/1940 | Humphrey | 73/208 |
| 3,415,119 | 12/1968 | Moore | 73/208 |
| 1,450,611 | 4/1923 | Schroeder | 73/208 |

FOREIGN PATENTS OR APPLICATIONS 572,095   2/1933   Germany .................. 73/208

*Primary Examiner*—Richard C. Queisser
*Assistant Examiner*—Arthur E. Korkosz
*Attorney*—Lane, Aitken, Dunner & Ziems

[57] ABSTRACT

A device for metering fluid flow through a conduit, including a flow chamber registering with the conduit, a plunger movable in the flow chamber in proportion to the amount of fluid flow through the chamber for giving an indication of the fluid flow, and a damping chamber for receiving a portion of the plunger. A plug is provided which extends into the damping chamber and is adapted to vent the damping chamber and locate the plunger in an operable position after venting.

11 Claims, 6 Drawing Figures

Patented Aug. 29, 1972
3,686,945
2 Sheets-Sheet 1
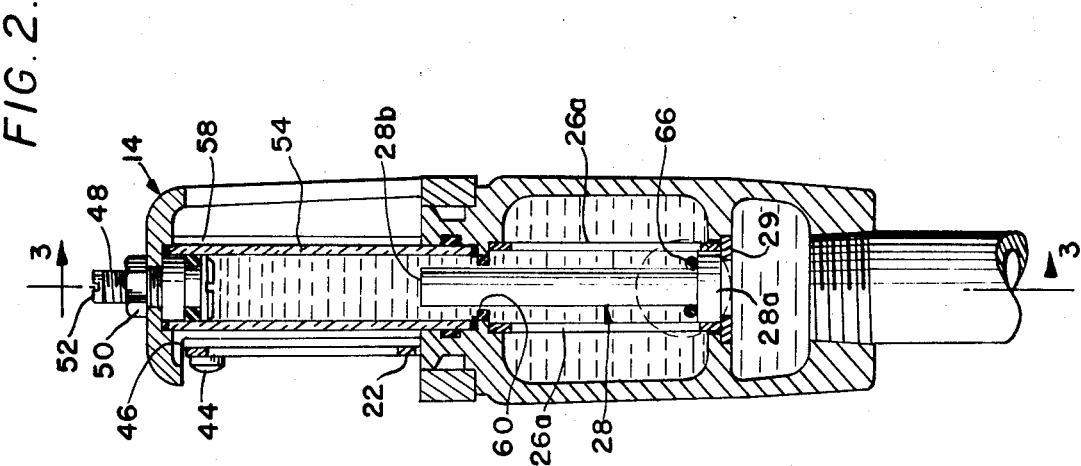
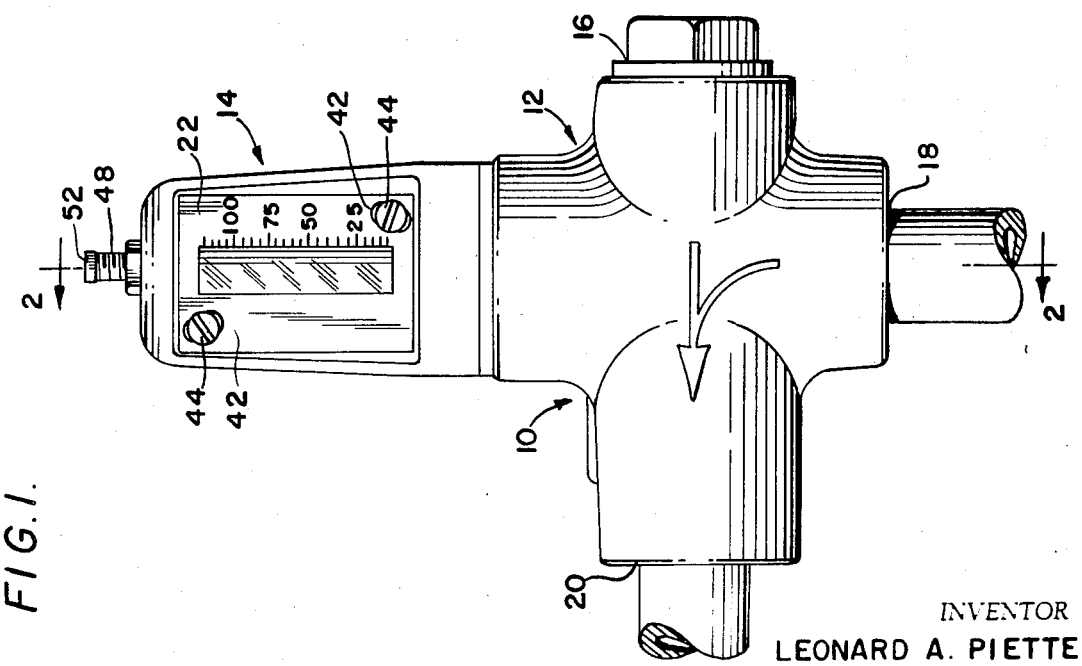
INVENTOR
LEONARD A. PIETTE
ATTORNEYS

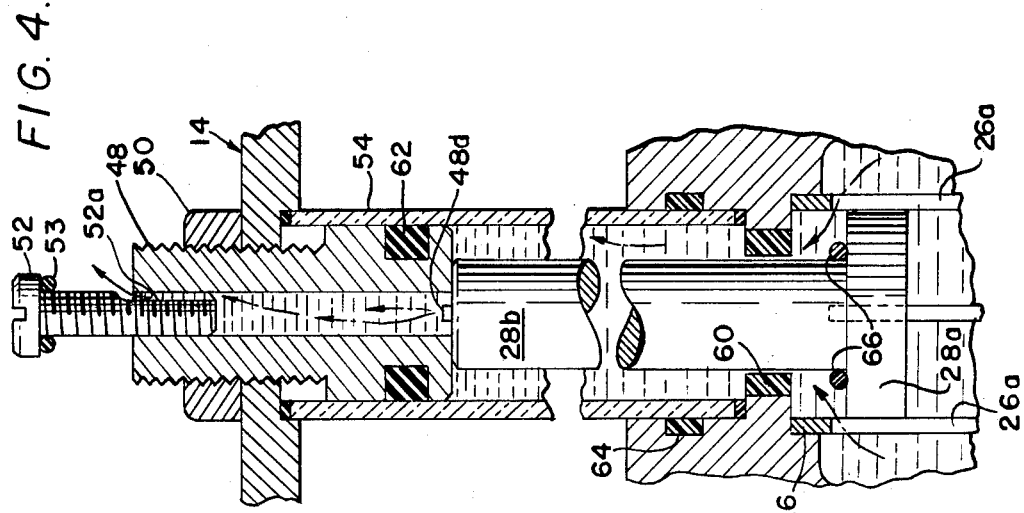
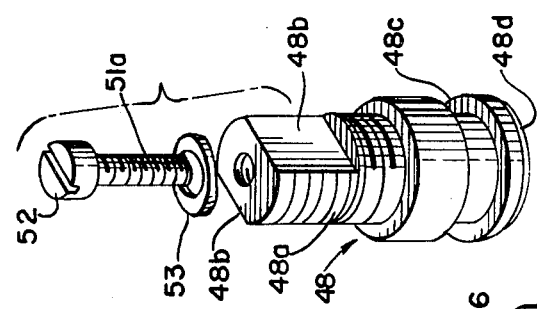
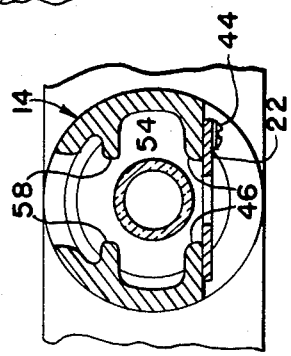
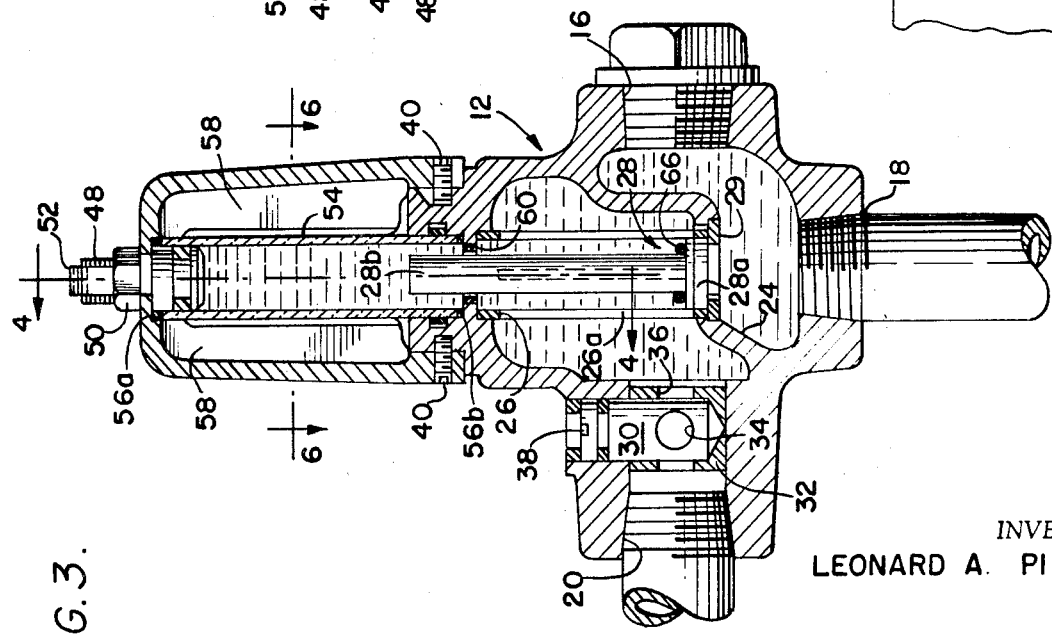
INVENTOR
LEONARD A. PIETTE
ATTORNEYS

VENT FOR FLUID FLOW METERING DEVICE

BACKGROUND OF THE INVENTION

This invention relates to a metering device and, more particularly, to a device for controlling and measuring fluid flow through a conduit.

Although many types of devices have been proposed for controlling and measuring fluid flow through a conduit, many suffer from one or more of several defects, especially in systems utilizing relatively small pipe sizes. For example, the prior art devices often do not provide a linear readout, and are susceptible to calibration and temperature errors as well as mechanical wear. They are also sensitive to turbulence caused by any fittings or valves immediately upstream or downstream of the device, and are susceptible to line pulsations which render their readouts relatively unstable. Also, they are not easily adaptable to systems having unusual line configurations, and are often difficult to read.

Units which eliminate one or more of these defects are usually so high in cost that they are prohibitive to high volume use, and this often limits the number that can be used in a relatively large system.

In U.S. Pat. application, Ser. No. 73,900 entitled "Fluid Flow Metering Device" filed concurrently herewith by Frank R. Thompson and assigned to the same assignee as the present invention, a device is disclosed which overcomes the above disadvantages and yet is relatively inexpensive in cost.

SUMMARY OF THE INVENTION

It is the object of the present invention to provide a metering device incorporating the features of the device disclosed in the above-identified patent application, and yet provide still another advantage.

Accordingly, it is a further object of the present invention to provide a vent unit for a fluid flow metering device which enables the device to be quickly and easily returned to an operating mode after venting.

Toward the fulfillment of the above objects, the device of the present invention comprises a casing adapted for connection to a fluid flow conduit and having a flow chamber registering with said conduit, means responsive to fluid flow through said flow chamber for moving in proportion to the amount of fluid flow through said chamber, means defining a damping chamber for said moving means, means for venting said damping chamber, and means for returning said moving means to an operable position after venting.

BRIEF DESCRIPTION OF THE DRAWINGS

Reference is now made to the accompanying drawings for a better understanding of the nature and objects of the present invention. The drawings illustrate the best mode presently contemplated for carrying out the objects of the invention and are not to be construed as restrictions or limitations on its scope. In the drawings:

FIG. 1 is a front elevational view of the control and measuring device of the present invention shown connected in a fluid flow system;

FIG. 2 is a cross-sectional view taken along the line 2—2 of FIG. 1;

FIG. 3 is a cross-sectional view taken along the line 3—3 of FIG. 2;

FIG. 4 is an enlarged cross-sectional view taken along the line 4—4 of FIG. 3;

FIG. 5 is an exploded perspective view of the plug and vent screw assembly utilized in the device of the present invention; and FIG. 6 is a cross-sectional view taken along the line 6—6 of FIG. 3.

DESCRIPTION OF THE PREFERRED EMBODIMENTS

Referring specifically to the drawings, the metering device of the present invention is shown in general by the reference numeral 10, and consists of a casing 12 having a cover 14 attached thereto. The casting 12 is in the general form of a globe valve casing having a pair of inlet orifices 16 and 18 and an outlet orifice 20, with the inlet orifice 16 being shown plugged for the purposes of example. An indicia plate 22 is affixed to the front portion of the cover 14 as viewed in FIG. 1, and includes indicia for providing an indication of fluid flow, as will be described in detail later.

As shown in FIGS. 2 and 3, a partition 24 extends across the casing 12 and has an opening therein which registers with a tube 26 having four elongated slots 26a formed therethrough. A plunger 28 moves axially in the tube 26 and comprises a piston portion 28a extending in a closely spaced relation to the inner walls of the tube, and a stem portion 28b integral with the piston portion. A seat 29 is provided in the opening in the partition 24, and receives an end of the tube 26 as well as the lower face of the piston portion 28a of the plunger 28 in the lowermost portion of the latter, as viewed in FIGS. 2 and 3.

A valve core 30 is disposed in a cage 32 mounted in the casing 12 adjacent the outlet orifice 20. A through opening 34 is formed through the valve core 30 which is adapted to register with a pair of aligned openings 36 provided in the cage 32 to permit the passage of fluid through the openings. The head of the valve core 30 has a slot 38 for engagement by a screwdriver, or the like, for rotating the valve core within the cage 32 to vary the degree of registration of the openings 34 and 36, and thus control the rate of fluid flow through the casing 12.

The cover 14 is attached to the upper portion of the casing 12 by means of a pair of set screws 40 engaging in a continuous channel formed in the outer surface of the casing which permits the cover, and therefore the indicia plate 22, to be secured in any angular position relative to the direction of fluid flow through the casing.

As shown in FIG. 1, the indicia plate 22 has a pair of elongated slots 42 formed therethrough which receive mounting bolts 44. Referring to FIGS. 2 and 6, a pair of webs 46 are formed in the front portion of the cover 14 and have a pair of apertures extending therethrough which register with the slots 42, with the mounting bolts 44 extending through these slots and apertures to secure the indicia plate 22 relative to the cover 14, while permitting a slight axial adjustment therebetween.

A vent plug 48 is provided in the upper portion of the cover 14 and is better shown in FIGS. 4 and 5. In particular, the vent plug has an upper threaded portion 48a which engages an opening formed through the cover 14, with a pair of parallel flat surfaces 48b also being formed in the upper portion for engagement by a wrench or the like. The base portion of the plug 48 has an annular groove 48c formed in the outer surface thereof, and a slot 48d formed in the bottom face thereof. A lock-nut 50 is provided in engagement with the threaded portion 48a of the plug to secure same relative to the cover 14.

A vent screw 52 is adapted to threadedly engage a corresponding bore formed through the plug 48, with the head of the screw having a slot to accommodate a screwdriver or the like. A gasket 53 provides a seal for the bore formed through the plug 48 when the screw 52 is tightened in the bore.

A cylindrical sight glass 54 is mounted between a pair of cushions 56a and 56b within the cover 14 and is framed by the indicia plate 22 relative to the front portion of the device. As shown in FIG. 6, the front portion of the sight glass 54 is exposed to the exterior through the slot in the indicia plate 22 and the space between the pair of webs 46, and a diametrically opposite portion of the sight glass is exposed to the exterior through the space between an additional pair of webs 58 located in the rear portion of the cover 14. The diametrically opposed spaces between the front webs 46 and the rear webs 58 permit light to be directed straight through the sight glass 54 and achieve a better readout, as will be apparent from the following.

A chamber is defined within the sight glass 54 and receives the stem portion 28b of the plunger 28, with the stem portion extending through an annular bushing 60 disposed in a shoulder provided in the top portion of the casing 12. A clearance is provided between the inner wall of the bushing 60 and the stem portion 28b of the plunger 28 to permit fluid leakage upwardly from the tube 28 into the chamber defined within the sight glass 54. A pair of annular seals 62 and 64 are provided in the groove 48c of the plug 48 in engagement with the sight glass 54, and between the sight glass and an inner wall formed in the upper portion of the casing 12, respectively, to prevent fluid leakage outwardly from the chamber defined within the sight glass 54.

An O-ring seal 66 is disposed immediately above the piston portion 28a of the plunger 28 and is adapted to engage the bushing 60 upon the plunger attaining its uppermost position.

In operation, and assuming it is desired to meter fluid flow in a system having a perpendicular conduit configuration at the desired metering point, the orifice 16 is plugged and the orifices 18 and 20 are respectively connected to two conduits in the system, as shown. The valve core 30 is rotated to regulate the flow of fluid through the casing 12, and assuming that this rotation results in an increased flow rate, a pressure differential will be created between the inside of the tube 26 and the outside thereof due to the throttling effected by the piston portion 28b cooperating with the elongated slots 26a formed in the tube to define a series of restricted openings for passage of the fluid. As a result of the pressure differential, the plunger 28 moves upwardly against its own weight and exposes more slot, thus dropping the pressure differential. This movement continues until the pressure is balanced, causing the piston portion 28a of the plunger 28 to come to a rest position somewhere between the ends of the tube 26. This upward movement of the plunger will result in the end of the stem portion 28b of the plunger 28 moving upwardly in the sight glass 54 relative to the indicia scale on the plate 22. The length of the scale is proportional to the weight of the plunger 28, the width and length of the slots 26a, and the diameter of the tube 26, and may be calibrated in terms of flow rate, such as gallons per minute.

During the above operation, some of the fluid will pass around the piston portion 28a of the plunger 28, upwardly in the tube 26, through the clearance provided between the bushing 60 and the stem portion 28b of the plunger, and into the chamber defined within the sight glass 54. This creates a damping effect on the upward movement of the plunger 28 which smooths out line pulsations and stabilizes the readout.

As a result of the above arrangement, an operator can simply rotate the valve core 30 while directly reading the amount of flow through the system, which enables him to adjust the flow to a predetermined rate.

When it is desired to remove the cover 14 for the purposes of cleaning the sight glass 54, etc., the two set screws 40 are loosened until the cover pops up and exposes the chamber defined within the sight glass 54 to atmospheric pressure. As a result the plunger 28 will move to its uppermost position, with the O-ring seal 66 engaging the bushing 60 to prevent any further flow of fluid upwardly beyond the bushing. Then the cover 14 can simply be removed without any danger of leakage When it is desired to resume operation after replacement of the cover 14, the screw 52 is maintained in its closed position the lock-nut 50 is released, and the plug 48 is rotated to move it downwardly until the bottom face of the plug engages the upper end of the stem 28b of the plunger 28. Further rotation and resulting axial movement of the plug 48 will cause the plunger 28 to move downwardly to the approximate position shown in FIG. 4, to break the sealing engagement between the O-ring 66 and the bushing 60. Also, the piston portion 28a of the plunger 28 exposes the upper portions of the slots 26a, permitting fluid to pass upwardly through the slots into the damping chamber defined within the sight glass 54. The plug 48 is then rotated back to its normal position and the lock-nut 50 is tightened.

The screw 52 can be raised slightly to release the seal between the gasket 53 and the top of the plug 48, thus permitting the chamber defined within the sight glass 54 to be vented of air or the like. The screw 52 is then lowered to its closed position to seal the bore of the plug 48 and the operator can be assured that the plunger 28 will be released for further metering operation, and that the damping chamber defined within the sight glass 54 will be vented.

There are advantages of the metering device of the present invention in addition to those apparent from the foregoing. For example, the inlet orifice 16 can be plugged and the outlet orifice 18 connected in a fluid flow system in the event there is a perpendicular alignment between the respective conduits. Also, after installation of the device, the cover 14, and therefore the indicia plate 22, can be rotated relative to the casing 12 to permit viewing of the stem portion 28b of the plunger 28 from any angle relative to the fluid flow pattern through the casing.

The provision of the sealing of the chamber defined by the sight glass 54 permits cleaning of the glass without the need to shut off the system. Further, the sight glass 54 does not have to be manufactured to a close tolerance due to the pressure of cushions 56a and 56b, thus effecting a significant cost saving. Since the plunger positions itself to maintain a constant pressure drop across the slot 26, the velocity at high rates of flow is nearly the same as that at low rates of flow, which reduces the effect of Reynolds number to a minimum. Further, a direct linear readout is provided which is directly proportional to the amount of flow thereof, eliminating the need for conversion tables or the like.

The device of the present invention is also insensitive to turbulence caused by fittings or valves immediately upstream or downstream of the device, and minimizes calibration and temperature errors, due to the elimination of springs and the like. Also, the use of a sharp-edged float reduces the effect of viscosity to a minimum.

Of course, variations of the specific construction and arrangement of the device disclosed above can be made by those skilled in the art without departing from the invention as defined in the appended claims.

I claim:

1. A device for metering fluid flow through a conduit, comprising a casing adapted for connection to said conduit and having a flow chamber registering with said conduit, means responsive to fluid flow through said flow chamber for moving in proportion to the amount of fluid flow through said chamber, means defining a damping chamber for said moving means, said latter means including a housing and closure means removably attached to said housing, and means including said movable means for establishing a seal between said damping chamber and said flow chamber in response to removal of said closure means from said housing.

2. The device of claim 1 wherein said closure means is adapted to break said seal upon attachment to said housing.

3. The device of claim 1 wherein said closure means includes means for venting said damping chamber.

4. The device of claim 3 wherein said means for venting said chamber comprises a screw threadably mounted in a bore formed in said closure means.

5. The device of claim 1 wherein said damping chamber registers with said flow chamber and is adapted to receive a portion of said fluid to create a static fluid pressure in said damping chamber which opposes the movement of said moving means.

6. The device of claim 5 wherein removal of said closure means relieves said static fluid pressure in said damping chamber and permits said moving means to move to an end portion of said flow chamber under the pressure of the fluid in said flow chamber.

7. The device of claim 6 wherein said sealing means includes a first seal member carried by said movable means and a second seal member proximate to said end portion of said flow chamber, said seal members adapted to engage and form said seal seal upon said movement of said moving means to said end portion of said flow chamber.

8. The device of claim 7 further comprising a cover extending over said casing, and closure means including a plug extending into said housing, said plug threadably engaging said cover and movable relative thereto and from a position whereby it forces said moving means from said end portion of said flow chamber to break said seal.

9. The device of claim 1 wherein sad moving means is in the form of a piston movable within said flow chamber and further comprising a stem connected at one end to said piston, the distal end of said stem extending in and movable relative to said damping chamber.

10. The device of claim 9 further comprising indicia means carried by said casing and cooperating with said stem for providing an indication of said flow.

11. The device of claim 1 further comprising means to regulate the amount of fluid flow through said flow chamber.

* * * * *